(12) United States Patent
Van Laar et al.

(10) Patent No.: US 10,899,096 B2
(45) Date of Patent: Jan. 26, 2021

(54) DRUM SET FOR MANUFACTURING A BEAD-APEX FOR A TIRE AND ASSEMBLY COMPRISING SAID DRUM SET

(71) Applicant: VMI HOLLAND B.V., Epe (NL)

(72) Inventors: Gerardus Johannes Catharina Van Laar, Epe (NL); Wim Van Beek, Epe (NL); Marco Slot, Epe (NL)

(73) Assignee: VMI HOLLAND B.V.

( * ) Notice: Subject to any disclaimer, the term of this patent is extended or adjusted under 35 U.S.C. 154(b) by 402 days.

(21) Appl. No.: 15/781,677

(22) PCT Filed: Nov. 25, 2016

(86) PCT No.: PCT/NL2016/050829
§ 371 (c)(1),
(2) Date: Jun. 5, 2018

(87) PCT Pub. No.: WO2017/105223
PCT Pub. Date: Jun. 22, 2017

(65) Prior Publication Data
US 2019/0001601 A1    Jan. 3, 2019

(30) Foreign Application Priority Data

Dec. 16, 2015   (NL) .................................... 2015968

(51) Int. Cl.
*B29D 30/48*   (2006.01)
(52) U.S. Cl.
CPC ........ *B29D 30/48* (2013.01); *B29D 2030/482* (2013.01); *B29D 2030/487* (2013.01); *B29D 2030/488* (2013.01)
(58) Field of Classification Search
CPC .............. B29D 30/48; B29D 2030/482; B29D 2030/487; B29D 2030/488
(Continued)

(56) References Cited

U.S. PATENT DOCUMENTS

| 8,794,288 B2 | 8/2014 | Janszen et al. ............... 156/403 |
| 8,932,420 B2 | 1/2015 | Janszen et al. .... B29D 30/0016 |

(Continued)

FOREIGN PATENT DOCUMENTS

| CN | 101513773 | 8/2009 | ............ B29D 30/32 |
| CN | 201338396 | 11/2009 | ............ B29D 30/30 |

(Continued)

OTHER PUBLICATIONS

International Search Report and Written Opinion issued in application No. PCT/NL2016/050829, dated Mar. 14, 2017 (12 pgs).

(Continued)

*Primary Examiner* — Timothy Kennedy
(74) *Attorney, Agent, or Firm* — Hayes Soloway P.C.

(57) ABSTRACT

Provided is a drum set for manufacturing a bead-apex for a tire and an assembly including the drum set, wherein the drum set has drum segments which form a drum, wherein the drum segments are radially movable, wherein the drum set is arranged to be movable between an operational position in which the drum set is supported on a base and a storage position in which the drum set is unsupported by the base. The drum set further includes a support member for supporting the drum segments of the drum set with respect to each other, wherein the support member is provided with guides for guiding the radial movements of the drum segments when the drum set is in the operational position, while the guides are arranged for retaining the drum segments of the drum set to the support member when the drum set is in the storage position.

33 Claims, 8 Drawing Sheets

(58) Field of Classification Search
USPC .................................................... 425/35, 36
See application file for complete search history.

(56) References Cited

U.S. PATENT DOCUMENTS

| | | | |
|---|---|---|---|
| 2002/0179227 A1 | 12/2002 | Cornet et al. ................. | 156/136 |
| 2013/0340911 A1 | 12/2013 | Lemaire et al. ........ | B60C 15/04 |
| 2013/0341827 A1 | 12/2013 | Lemaire et al. ....... | B29D 30/48 |
| 2014/0000752 A1 | 1/2014 | Van Laar ................. | B21F 3/02 |
| 2014/0161584 A1 | 6/2014 | Kohnen et al. ........ | B29D 30/48 |
| 2015/0014121 A1* | 1/2015 | Slot ........................ | B65G 29/00 |
| | | | 198/339.1 |

FOREIGN PATENT DOCUMENTS

| | | | | |
|---|---|---|---|---|
| CN | 103507285 | 1/2014 | ............ | B29C 47/02 |
| CN | 103507575 | 1/2014 | ............ | B29D 30/50 |
| EP | 2743069 | 6/2014 | ............ | B29D 30/48 |
| GB | 1468717 | 3/1977 | ............ | B29H 17/32 |
| JP | H1086241 | 4/1998 | ............ | B21F 37/00 |
| TW | 201345748 | 11/2013 | ............ | B60B 25/02 |
| WO | WO2013095106 | 6/2013 | ............ | B29D 30/48 |

OTHER PUBLICATIONS

Taiwanese Office Action (w/machine translation) issued in application No. 105139446, dated Jan. 20, 2020 (6 pgs).

* cited by examiner

DRUM SET FOR MANUFACTURING A BEAD-APEX FOR A TIRE AND ASSEMBLY COMPRISING SAID DRUM SET

BACKGROUND

The invention relates to a drum set for manufacturing a bead-apex for a tire and assembly comprising said tooling.

WO 2013/095106 A1 discloses a tool for removing or mounting drum segments with respect to a manufacturing device. The tool is provided with a support body and a plurality of coupling sections that interact with coupling members on the drum segments to couple the drum segments to the support body. When coupled, the drum segments can be removed from the manufacturing device as a set together with the tool. The known tool fixates the drum segments when coupled, thereby retaining their respective positions. The tool, with the drum segments coupled to it, can thus be easily placed back onto the manufacturing device.

A drawback of the known tool is that each of the drum segments has to be in exactly the right position to allow for the coupling members to be coupled to the tool. Also the drum segments have to be carefully and accurately transferred from the manufacturing device onto the tool and vice versa, to prevent improper placement or even malfunctioning of the drum segments during operation of the manufacturing device. Finally, the tool has to be decoupled from the drum segments prior to operation of the manufacturing device. In the meantime, the tool can be misplaced or used for a different set of drum segments so that, at the time of removal, there is no tool available anymore to remove the previously mounting drum segments.

It is an object of the present invention to provide a drum set for manufacturing a bead-apex for a tire and assembly comprising said tooling, wherein the handling of the drum set during mounting and/or removal can be improved.

SUMMARY OF THE INVENTION

According to a first aspect, the invention provides a drum set for manufacturing a bead-apex for a tire, wherein the drum set comprises a plurality of drum segments which are distributed about a central axis of the drum set to form a drum, wherein the drum defines a circumferential edge for receiving a bead, wherein the drum segments of the drum set are radially movable with respect to the central axis to expand and contract the circumferential edge, wherein the drum set is arranged to be movable between an operational position in which the drum set is supported on a base for receiving a bead and a storage position in which the drum set is unsupported by said base, wherein the drum set further comprises a support member for supporting the drum segments of the drum set with respect to each other, wherein the support member is provided with guides for guiding the radial movements of the drum segments when the drum set is in the operational position, while the guides are arranged for retaining the drum segments of the drum set to the support member when the drum set is in the storage position.

The drum segments of the drum set can thus be removed from the base while being retained as a set by the support member. This can prevent drum segments of different drum sets getting mixed up. Furthermore, the tolerances and accuracy of the drum set during mounting and operation can be significantly improved. As the support member forms part of the drum set in both the storage position and the operational position, the support member does not have to be removed during operation of the drum set.

In an embodiment the weight of the drum segments is fully supported on the support member in the operational position and/or the storage position. No additional tools are required to support and/or retain the drum segments.

In an embodiment the drum set is stackable with respect to identical drum sets. Thus, multiple drum sets can be stacked as a group in a storage position.

In an embodiment the drum set comprises indexing parts for indexing the position of the drum set with respect to identical drum sets. This can improve the positioning of identical drum sets during storage, e.g. when identical drum sets are to be mounted as a group to a plurality of bases.

In an embodiment the drum segments are provided with handling members for handling by a manipulator. Thus, the drum set can be handled by a manipulator via the handling members at the drum segments.

According to a second aspect, the invention provides an assembly for manufacturing a bead-apex for a tire comprising the aforementioned drum set and a base for supporting said drum set, wherein the base is provided with one or more mounting members for mounting the drum set in the operational position on the base.

In an embodiment thereof the support member, in the operational position of the drum set on the base, extends between the base and the plurality of drum segments. The drum segments can thus be kept free from the support member at the side facing away from the base and the support member. This side, typically the front of the assembly, can be approached easily by an operator or a manipulator, for mounting and removal of the drum set and/or for placement and removal of the bead and/or the bead-apex.

In an embodiment the base comprises an actuator for actuating the radial movement of the drum segments, wherein the actuator is arranged to drive the drum segments directly. The support member can thus be bypassed in the drive chain between the base and the drum segments.

In a combination of the previous two embodiments, the support member is provided with an aperture to allow the actuator to directly drive the drum segments. The aperture allows the actuator to reach through the support member towards and into direct engagement with the drum segments.

In an embodiment each of the plurality of drum segments is provided with a drive wheel facing towards the aperture in the support member, wherein actuator has a conical shape that tapers in the direction of the drum segments, wherein the actuator is movable in a driving direction parallel to the central axis to displace the drum segments radially outwards. The actuator can thus actuate the radial movement of the drum segments simply by direct contact between the drive wheels running over its tapering and/or conical shape.

In an embodiment the assembly further comprises an apex support surface extending concentrically around the drum segments. The apex support surface can support the apex during and after the application of said apex around the bead. The apex support surface can be provided under an oblique slope or angle corresponding to the required angle of the apex with respect to the plane defined by the annular bead.

In a first embodiment thereof the support member extends radially outwards beyond the circumferential edge, wherein the apex support surface is formed by the part of the support member extending radially outwards beyond the circumferential edge. The apex support surface can thus be an integral part of the support member and thus can also be mounted and/or removed together with the drum set.

In an alternative second embodiment thereof the assembly comprises an annular member that is arranged to be fitted concentrically around the drum segments, wherein the apex support surface is formed by the annular member. The annular member can be interchanged for another annular member with other characteristics, e.g. dimensions and/or the apex angle.

Preferably, the annular member is arranged to be coupled to the support member. This allows for the annular member to be placed independently from the support member. Alternatively, the annular member is arranged to be mounted to the base. In this case, the annular member can be mounted to the support member prior to mounting of the drum set to the base, e.g. at a remote storage location. The storage location may hold a variety of annular members to choose from.

In a further alternative third embodiment thereof the drum set comprises a number of support segments equal to the number of drum segments, wherein each support segment is mounted to a respective drum segment so as to move together with said respective drum segment in the radial direction, wherein the apex support surface is formed by the support segments. These support segments can be supported indirectly on the support member via the drum segments. The support segments can expand and contract radially together with the drum segments, thus increasing the dimensions of the apex support surface in proportion to the contraction and/or expansion of the circumferential edge as defined by the drum segments.

In a preferred embodiment the assembly comprises a plurality of the aforementioned drum sets. The drum sets can be used at various production stations of an assembly.

In particular, it is preferred that the assembly comprises a plurality of bases for simultaneously supporting an equal number of the plurality of drum sets in respective operational positions. Thus, a selection or a group of drum sets from the plurality of drum sets can be used simultaneously on an equal number of bases, e.g. in an equal number of production stations of the assembly.

In an embodiment the assembly comprises a turret that is rotatable about a turret axis, wherein the plurality of bases are mounted to the turret and distributed around the turret axis so as to be rotated by the turret through different production stations. The drum sets can be moved through the different production stations consecutively, while various production operations are performed at each production station.

In an embodiment the plurality of drum sets comprises a number of identical drum sets equal to the number of bases. Thus, it is possible to select a group of identical drum sets to be mounted to an equal number of bases.

In an embodiment the identical drum sets form a group of drum sets that is arranged to be used during the production of a batch of identical bead-apexes. Said group can thus be used continuously as long as the batch properties stay the same. The group has to be interchanged for another group between batches if the batch properties change.

In a further embodiment the assembly further comprises a storage member for receiving a plurality of the drum sets. The storage member can be used to store a plurality of drum sets for later use.

In an embodiment the storage member is arranged for receiving all drum sets of the same group. Thus, all drum sets of the same group can be kept together to prevent mixing up of drum sets of different groups.

In an embodiment all drum sets of the same group are arranged to be stacked on the storage member. Stacking can reduce the space consumed by the storage of the drum sets.

In an embodiment the wherein each drum set of the group comprises indexing parts for indexing the position of said drum set with respect to the other drum sets within the group. This can improve the positioning of drum sets during storage, e.g. when identical drum sets are to be mounted as a group to a plurality of bases.

In an embodiment the storage member is mobile and arranged for autonomously travelling a path between a production location near the bases and a more remote storage location. This can automate the storage process and prevent human error.

In an embodiment the assembly further comprises a manipulator for mounting and removing one drum set with respect to its base. The manipulator can be used to assist or take over manual placement and removal of the drum sets.

In an embodiment each drum segment is provided with a handling member, wherein the manipulator is provided with an equal number of gripping members for gripping said handling members. The handling members allow for secure gripping of the drum set at the drum segments by the manipulator.

In an embodiment the handling members and the gripping members are formed as mutually matching, mutually meshing and/or mutually engaging hooks. The hooks can be engaged in a relatively simple manner, without further securing mechanisms, by radially moving the gripping members outwards into meshing engagement with the handling members at the drum segments.

In an embodiment the gripping members are additionally arranged for placing and/or removing a bead or a bead-apex with respect to the drum set. Thus, the same manipulator can be used for both mounting and removal of the drum set and placement and removal of the bead and/or the bead-apex.

In an embodiment the drum segments are mutually spaced apart in the circumferential direction to form radially extending access channels between the drum segments, wherein the gripping members are arranged to be inserted into the access channels and to be moved radially outward into engagement with a bead or a bead-apex at the circumferential edge of the drum. The access channels allow the gripping members to be moved into the drum set up to the location of the bead or bead apex.

In an embodiment the handling members are offset in the circumferential direction with respect to the access channels, wherein the manipulator comprises a gripping head that is rotatable about the central axis of the drum, wherein the gripping members are provided on the gripping head such that rotation of the gripping head about the central axis of the drum brings the gripping members radially into alignment with either the access channels or the handling members. Thus, switching between gripping of the drum set and gripping of the bead or bead-apex can be performed by simply rotating the gripping head about the central axis.

In an embodiment the manipulator comprises a robot or a robot arm. The robot or robot arm can provide more degrees of freedom, allowing the manipulator to handle the drum sets both at the base and near the storage member.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-4 show an assembly 1 according to a first embodiment of the invention for manufacturing a bead-apex for a tire. A bead-apex is a well-known tire component that is assembled by applying an apex or apex filler strip (not shown) circumferentially around a bead or a bead wire bundle (not shown) that is held in an annular configuration at the assembly 1.

Figure 1:
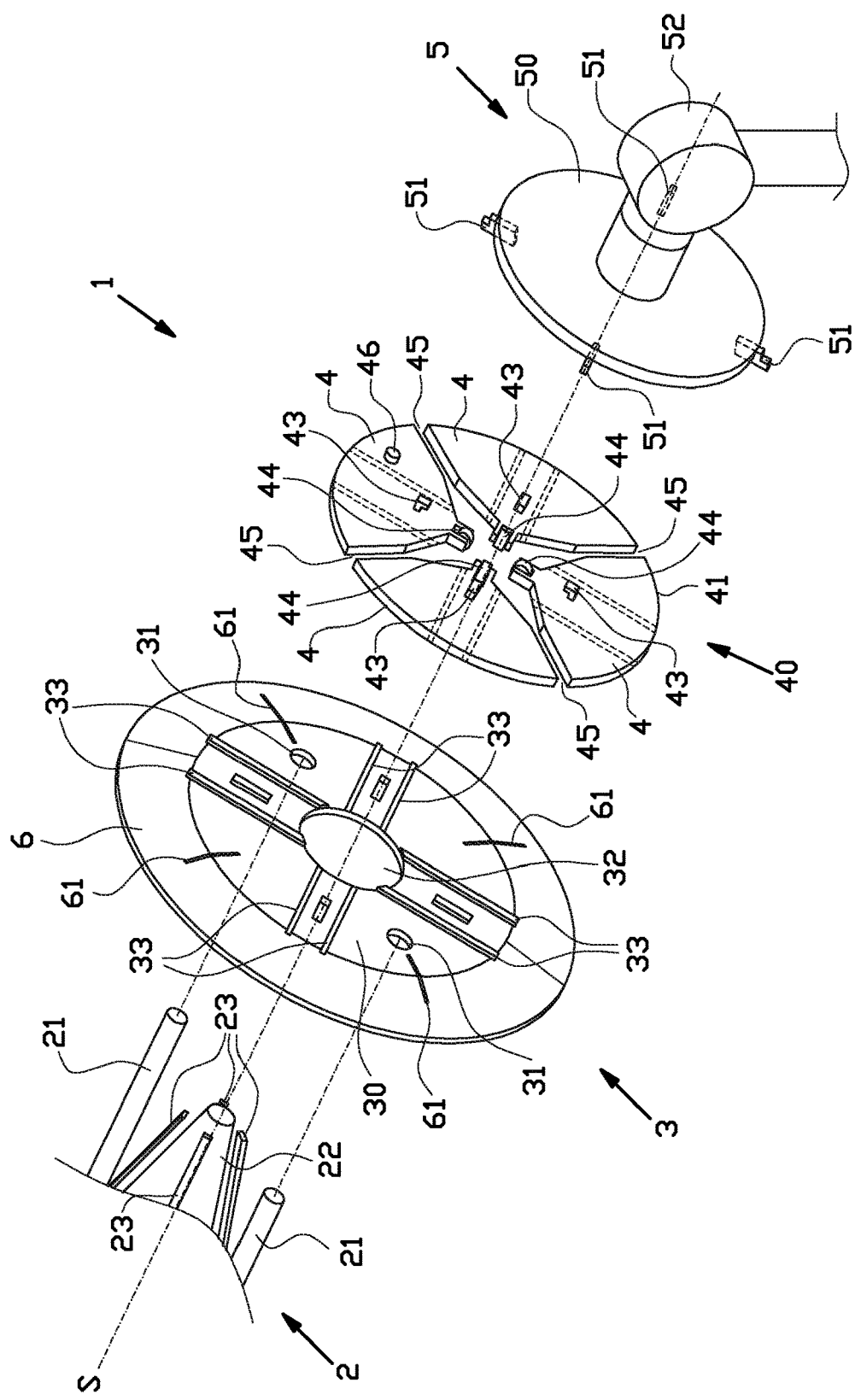
FIG. 1 shows an isometric view of an assembly for manufacturing a bead-apex for a tire, according to a first embodiment of the invention, comprising a base, a support plate, a plurality of drum segments and a manipulator.

As shown in FIG. 1, the assembly 1 comprises a base 2, a support member 3 that is arranged to be mounted on said base 2, a plurality of drum segments 4 that are arranged to be support on the support member 3 and a manipulator 5 that is arranged for mounting and removing the support member 3 with respect to the base 2. In this example, the manipulator 5 may also be used to place the bead on the assembly 1 and to remove the bead-apex from the assembly 1. The drum segments 4 form a drum 40 with a central axis S and a circumferential edge 41 for supporting and/or radially clamping the bead (not shown). The assembly 1 further comprises an apex support surface 6 extending circumferentially around and radially on the outside of the plurality of drum segments 4, concentrically to the circumferential edge 41. The apex support surface 6 is arranged for directly or in direct contact supporting the apex of the bead-apex. As such, the apex support surface 6 has been given a specific slope or angle matching the desired oblique angle of the apex with respect to the plane as defined by the annular bead. In this exemplary first embodiment, the apex support surface 6 is formed by the support member 3. The apex support surface 6 can be flat, linear, convex, concave or can be given any suitable curvature or shape to optimally support the apex and/or the bead. In particular, the apex support surface 6 can be non-linear, e.g. convex or concave, in the radial direction with respect to the central axis S for optimally supporting beads of various sizes at or near the circumferential edge 41. Such a non-linear apex support surface 6 may approximate or closely match the shape of the bead to reduce the occurrence of air-inclusions or air pockets.

Figure 3:
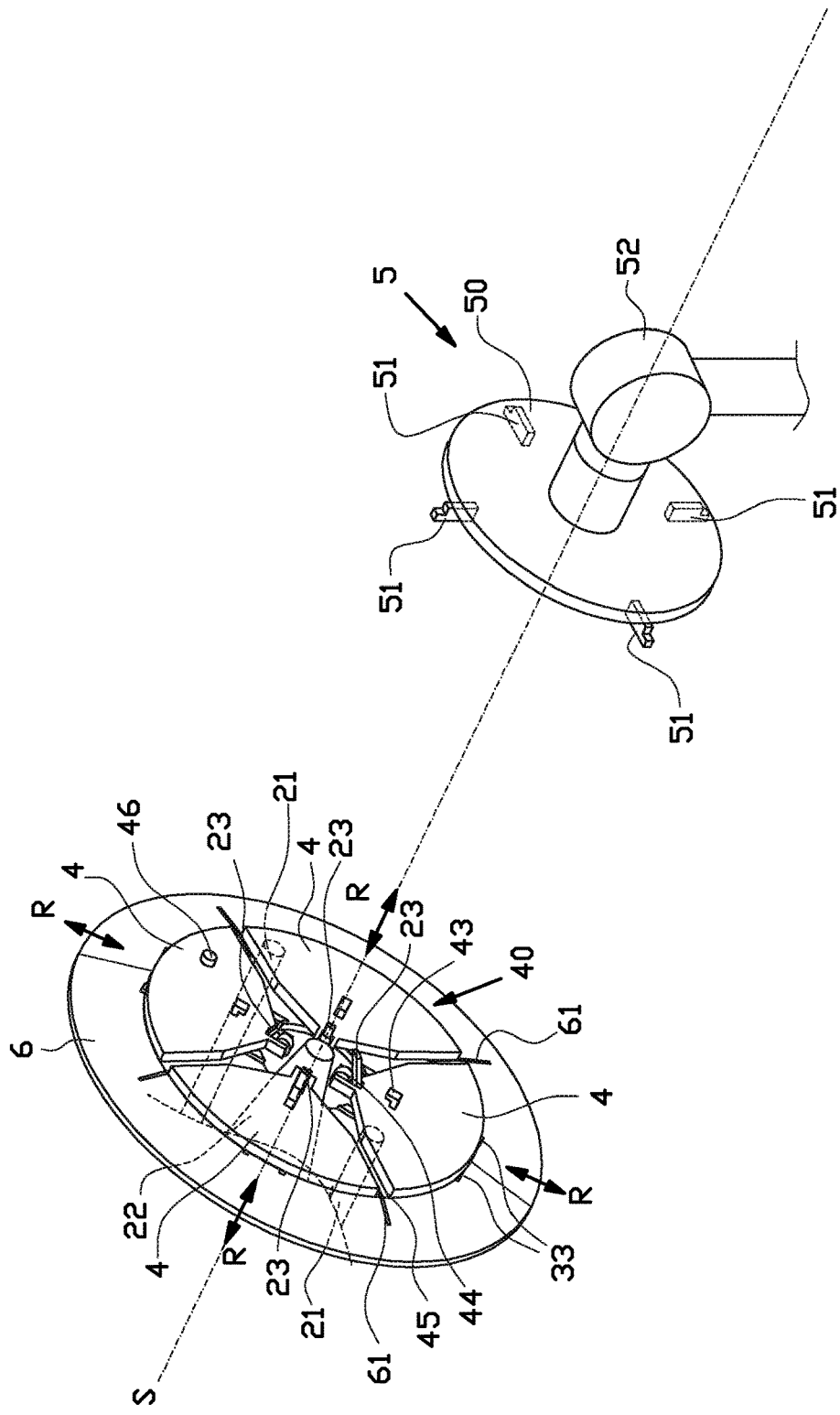
FIG. 3 shows an isometric view of the assembly according to FIG. 2, in which the drum set is supported on the base.

The base 2 comprises one or more mounting members 21 for receiving and/or positioning the support member 3 and an actuator 22 for actuating the drum segments 4. In this example, the actuator 22 has a conical shape that tapers in the direction of the drum segments 4. In particular, the actuator 22 is formed as a mandrel. The actuator 22 is movable in a driving direction D parallel to the central axis S. The support member 3 comprises a plate-like body 30 and corresponding mounting holes 31 and a central aperture 32 in said body 30 for receiving the mounting members 21 and the actuator 22, respectively. FIG. 3 shows the support member 3 in an operational position on the base 2.

Figure 2:
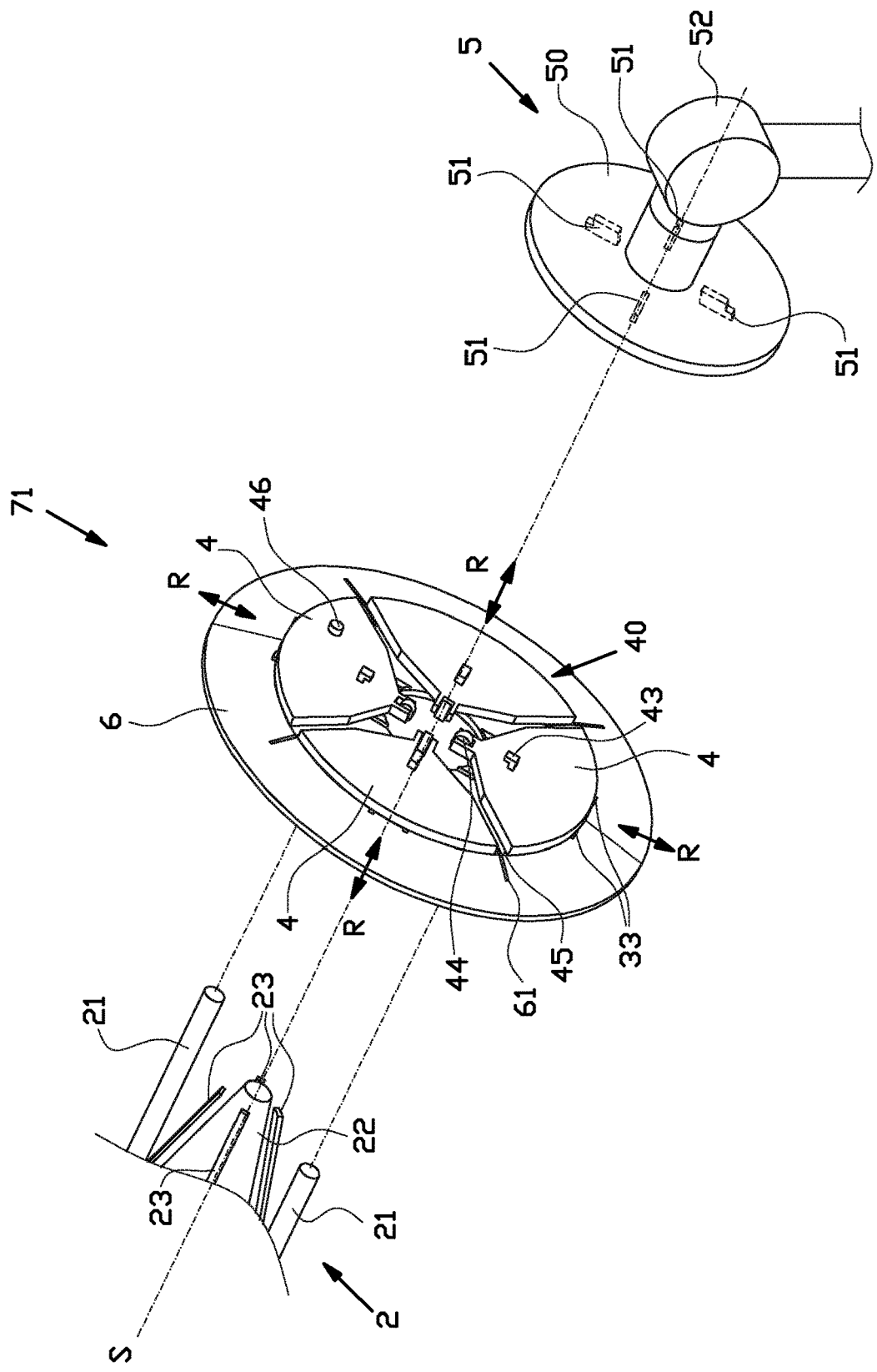
FIG. 2 shows an isometric view of the assembly according to FIG. 1, in which the drum segments are mounted on the support plate to form a drum set.

As shown in FIGS. 1 and 2, the plurality of drum segments 4, in this example four drum segments 4, are evenly distributed in the circumferential direction around the central axis S to form the drum 40. The drum segments 4 are mounted to the support member 3 to form a first drum set 71 together with said support member 3. As shown in FIG. 1, each drum segment 4 has a plate-like body 42 forming a circular sector of the drum 40, a handling member 43 on top of said plate-like body 42, facing towards the manipulator 5 for handling by said manipulator 5 and a drive wheel 44 at the radial inside of the drum segment 4, near the central aperture 32 of the support member 3 and facing towards the actuator 22. The drum segments 4 are slidably supported on the support member 3 in a radial direction R perpendicular to the central axis S of the drum 40. By sliding the plurality of drum segments 4 inwards and outwards in the radial direction R, the diameter and/or the circumferential edge 41 of the drum 40 can be contracted and expanded, respectively. By expanding the drum 40, the bead can be clamped or locked radially from the inside, while contracting the drum 40 releases the bead or the bead-apex after assembly thereof.

Figure 4:
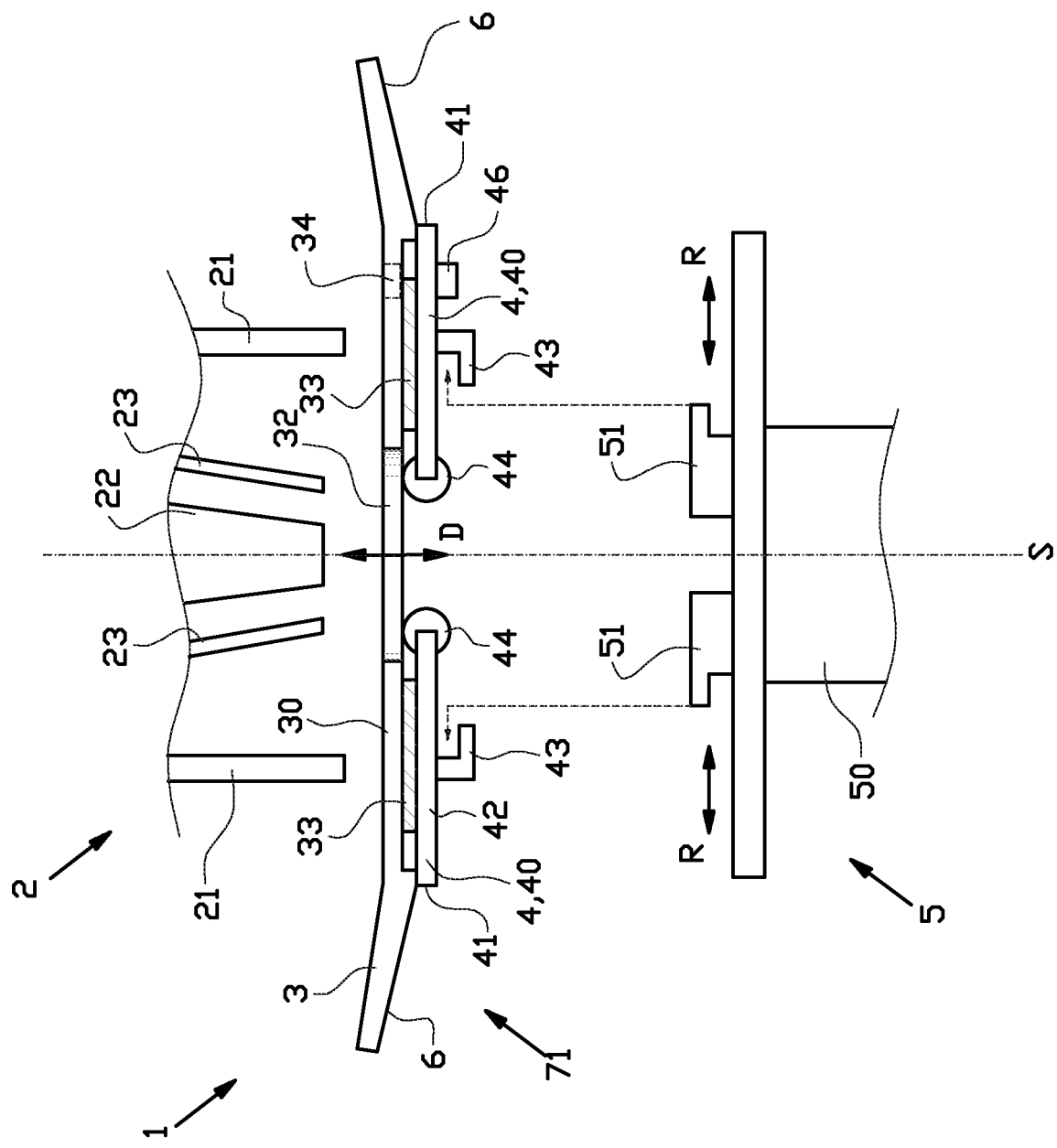
FIG. 4 shows a cross section view of the drum set according to the line IV-IV in FIG. 2.

As best seen in FIGS. 1 and 4, the support member 3 comprises a plurality of guides 33 for guiding the radial movements R of the drum segments 4 when the drum set 71 is in the operational position on the base 2. In said operational position, the actuator 22 of the base 2 projects or protrudes through the central aperture 32 of the support member 3 and engages with the drive wheels 44 of the plurality of drum segments 4 to actuate their respective radial movements R. The actuator 22 thus drives the drum segments 4 directly or via direct contact. Optionally, the actuator 22 is provided with fingers 23 that hold the drive wheels 44 against the conical shape of the actuator 22, even when the actuator 22 is retracted away from the drive wheels 44. As best seen in FIG. 3, the fingers 23 are arranged to protrude through the drum segments 4 at a side of the drive wheels 44 that faces away from the conical shape of the actuator 22. The support member 3 holds the drum segments 4 of the first drum set 71 together by extending between the plurality of drum segments 4 and the base 2 in the direction of the central axis S. The support member 3 does not hinder nor interfere with the operation of the actuator 22.

As shown in FIG. 4, the apex support surface 6 is fixedly connected to or forms a single or integral part with the support member 3. Hence, the support member 3 extends radially outwards beyond the circumferential edge 41 as defined by the drum segments 4. The apex support surface 6 is formed on the part of the support member 3 extending radially outwards beyond the circumferential edge 41 as defined by the drum segments 4. The plurality of drum segments 4 are moved in the radial direction R towards and away from the apex support surface 6. The apex support surface 6 forms part of the first drum set 71 and is removed together with said first drum set 71.

Figure 5:
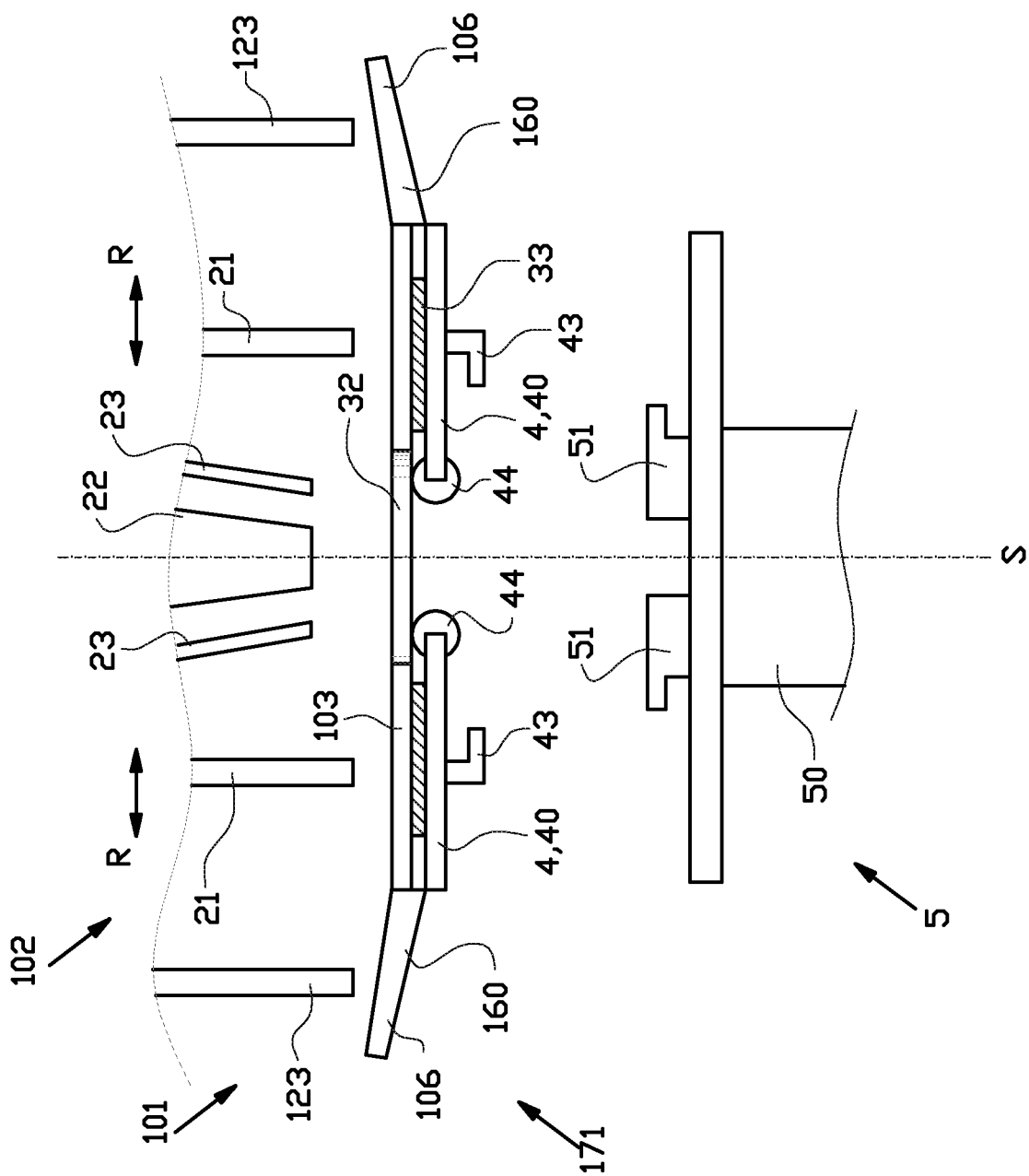
FIG. 5 shows a cross section view of an alternative drum set according to a second embodiment of the invention.

FIG. 5 shows an alternative assembly 101 according to a second embodiment of the invention comprising an alternative first drum set 171. The alternative first drum set 171 differs from the first drum set 71 as shown in FIG. 4 in that the apex support surface 106 is formed by an annular member 160 that is placed concentrically around an alternative support member 103. In this exemplary embodiment, an alternative base 102 is provided with additional mounting members 123 for mounting the annular member 160. Alternatively, the annular member 160 may be detachably connected to the support member 103. The separate annular member 160 provides the advantage that the alternative first drum set 171 can be combined with a variety of different annular members 160, e.g. with varying apex support angles.

Figure 6:
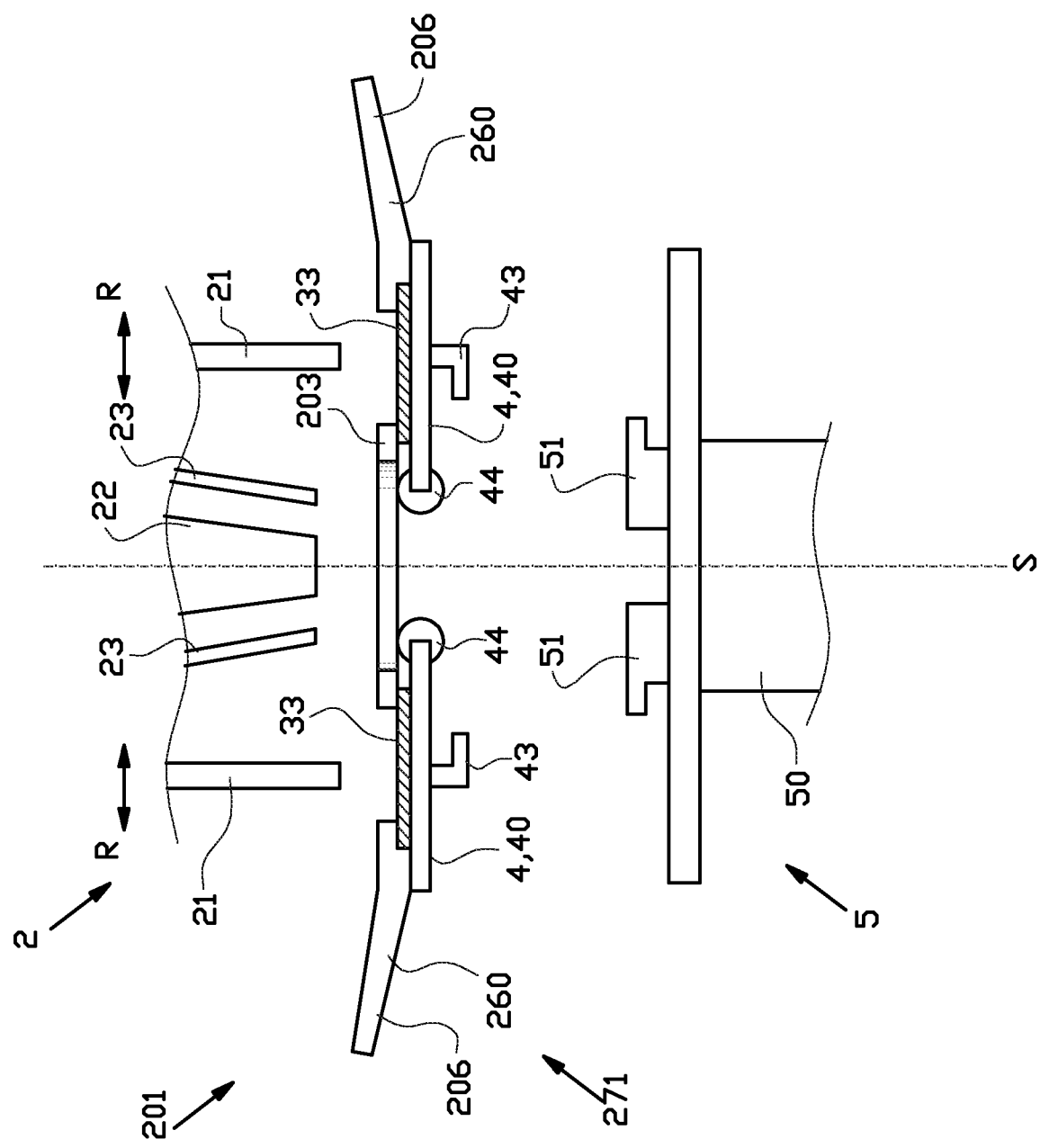
FIG. 6 shows a cross section view of a further alternative drum set according to a third embodiment of the invention.

FIG. 6 shows a further alternative assembly 201 according to a third embodiment of the invention, comprising a further alternative first drum set 271. The first drum set 271 differs from the first drum set 71 as shown in FIG. 4 and the alternative first drum set 171 as shown in FIG. 5 in that the apex support surface 206 is formed by a number of support segments 260 equal to the number of drum segments 4. Each support segment 260 matches the sector of the drum 40 formed by its respective drum segment 4. Each support segment 260 is fixedly mounted to said respective drum segment 4 so as to move together with said respective drum segment 4 in the radial direction R. The support segments 260 are thus indirectly supported on the support member 203 via the respective drum segments 4.

As shown in FIGS. 1-4, the manipulator 5 comprises a gripping head 50 with a plurality of gripping members 51 that are arranged to engage the handling members 43 at the plurality of drum segments 4. The gripping members 51 are radially movable to match the radial position of the handling members 43 at the plurality of drum segments 4. In this exemplary embodiment, the handling members 43 and the gripping members 51 are formed as mutually matching, mutually meshing and/or mutually engaging hooks. The gripping members 51 can thus be hooked into the handling members 43 by radially contracting the gripping members 51 to a smaller diameter than the handling members 43 and by subsequently radially expanding the gripping members 51. The same gripping members 51 can also engage the bead or bead-apex radially from the inside. For this purpose, the plurality of drum segments 4 of the first drum set 71 are mutually spaced apart in the circumferential direction to leave a plurality of radially extending access channels 45 between the drum segments 4. The apex support surface 6 is provided with a plurality of slits 61 at the bottom of the access channels 45.

The gripping head 50 of the manipulator 5 is preferably rotatable about a rotation axis parallel to the central axis S of the drum 40 to radially align the gripping members 51 with the access channels 45, as shown in FIG. 3. With respect to the gripping orientation in FIG. 2, the gripping head 50 is rotated over approximately forty-five degrees. The gripping members 51 can now be inserted into the access channels 45 and subsequently be moved radially outwards to engage the bead or the bead-apex at the circumferential edge 41 of the drum 40. The slits 61 in the apex support surface 6 allow for the gripping members 51 to move underneath or behind the bead in the direction of the central axis S.

The gripping head 50 is preferably mounted on a robot or a robot arm 52. The robot arm 52 has a considerable amount of freedom of movement, in particular six degrees of freedom, to allow for a variety of programmable handling operations in close proximity to and spaced apart from the base 2. In particular, the robot arm 52 is arranged for transferring the first drum set 71 between the operational position on the base 2 and a storage position. In the storage position, the guides 33 are arranged for retaining the drum segments 4 of the drum set 71 to the support member 3, even when the drum set 71 is completely removed from the base 2 and/or in the storage position. The support member 3 thus keeps the drum segments 4 together as a set in both the operational position and the storage position.

Figure 7:
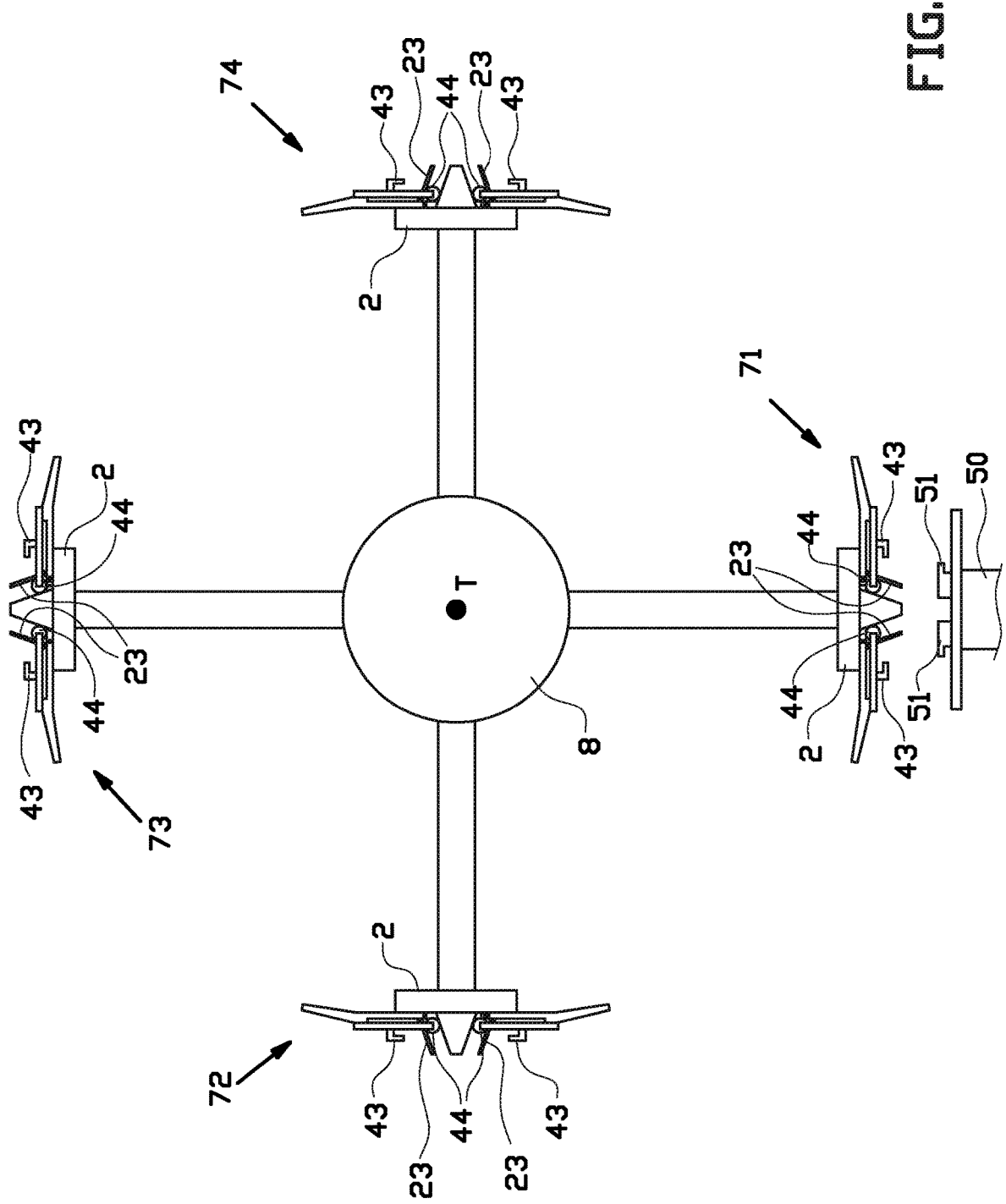
FIG. 7 shows a plurality of the drum sets according to any one of the preceding embodiments, being mounted on a turret with a plurality of bases.

FIG. 7 shows that the assembly 1 may comprise a plurality of drum sets 71, 72, 73, 74. The plurality of drum sets 71, 72, 73, 74 are supported on an equal number of bases 2. In this particular example, the drum sets 71, 72, 73, 74 are mounted to a turret 8 that is rotatable about a turret axis T to rotate each of the drum sets 71, 72, 73, 74 through a plurality of stations during batch production of identical bead-apexes. Preferably, the plurality of drum sets 71, 72, 72, 74 are identical or substantially identical in configuration and/or dimensions for a single batch of bead-apexes. The drum sets 71, 72, 73, 74 thus form a group 75 that is interchangeable for another group (not shown) between each batch. The manipulator 5 is arranged in close proximity to the turret 8 to mount and/or remove the drum sets 71, 72, 73, 74 with respect to the bases 2 of the turret 8 between subsequent batches. All drum sets 71, 72, 73, 74 of the group 75 are mounted and/or removed together.

Figure 8:
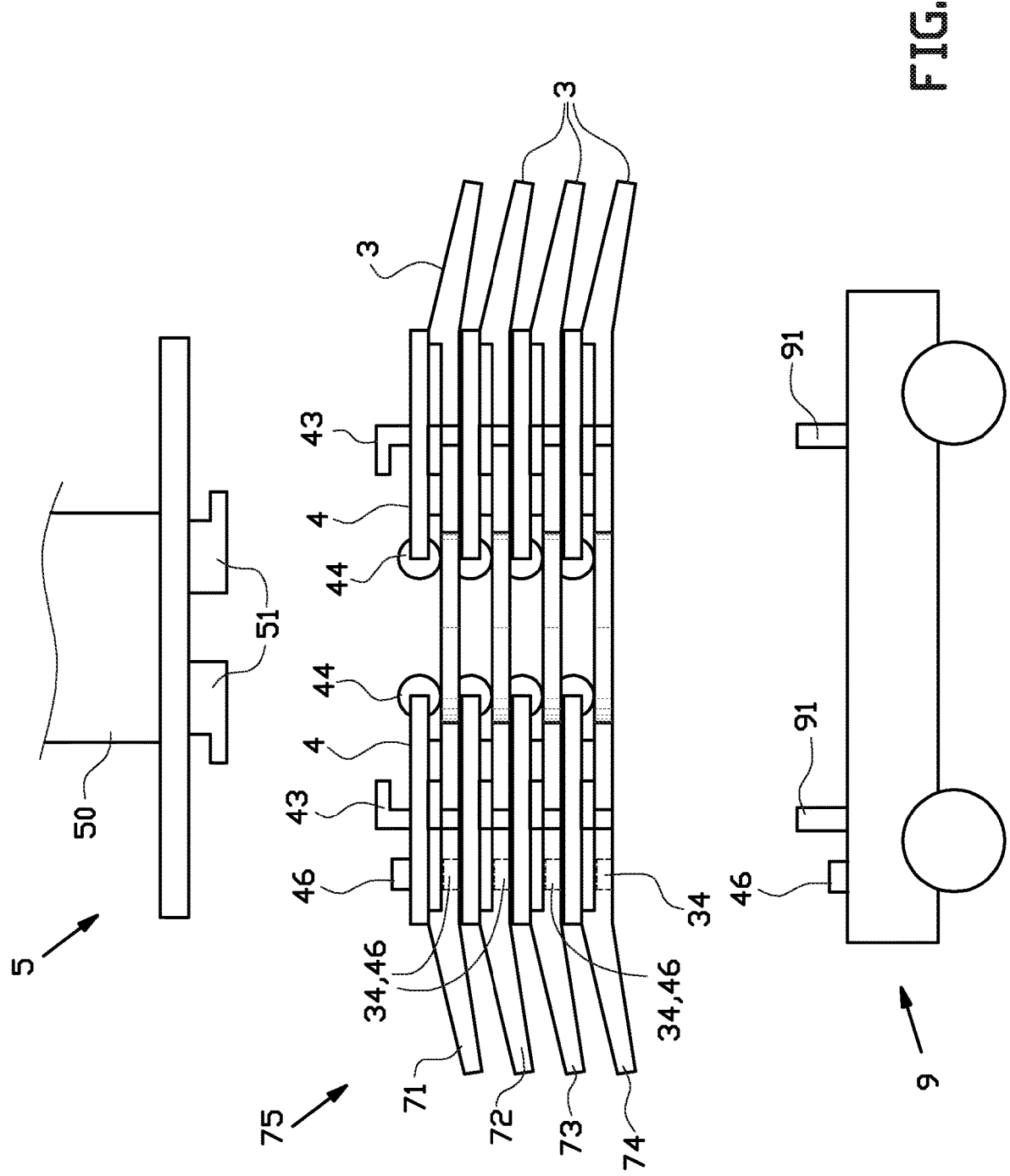
FIG. 8 shows a storage member for storing the plurality of drum sets according to FIG. 7 in a stacked configuration.

As shown in FIG. 8, the assembly 1 further comprises a storage member 9 for storing all drum sets 71, 72, 73, 74 of the same group 75. The storage member 9 thus prevents drum sets of different groups from getting mixed up. The storage member 9 is preferably mobile, e.g. a carriage. Most preferably, the storage member 9 is an automated or autonomous vehicle that can travel a predetermined path between a production location near the manipulator 5 and a more remote storage location. As shown in FIG. 8, the storage member 9 comprises a platform 90 for supporting a stack of the drum sets 71, 72, 73, 74. In this exemplary embodiment, the storage member 9 is provided with mounting members 91 similar to those of the base 2 to be inserted through the corresponding mounting holes 31 of the respective drum sets 71, 72, 73, 74. The mounting members 91 extend through the mounting holes 31 of at least the lowest of the drum sets 71, 72, 73, 74 supported on the storage member 9. In particular, the mounting members 91 are dimensioned so that they fit through the access channels 45 between the drum segments 4 of each drum set 71, 72, 73, 74. Additionally or alternatively, the storage member 9 is provided with a male indexing part 46 similar to the male indexing parts 46 of the drum sets 71, 72, 73, 74. The lowest of the drum sets 71, 72, 73, 74 can thus be correctly aligned with its female indexing part 34 onto the male indexing part 46 at the storage member 9. Each subsequent drum set 72, 73, 74 is aligned with respect to a lower one of the drum sets 72, 73, 74 by placing its female indexing part 34 onto the male indexing part 46 of the lower drum set 71, 72, 73, 74. The support members 3 of each drum set 71, 72, 73, 74 are provided with recesses at the location of and facing towards the handling members 43 of a lower drum set to improve the stacking ability of the drum sets 71, 72, 73, 74.

As further shown in FIG. 8, the respective drum sets 71, 72, 73, 74 are provided with a male indexing part 46 and a female indexing part 34 that engage each other in only one orientation of the drum sets 71, 72, 73, 74. The indexing parts 34, 46 thus prevent misalignment of the drum sets 71, 72, 73, 74 and/or ensures that all drum sets 71, 72, 73, 74 of the same group 75 are stored in the same orientation within the stack. In this exemplary embodiment, the male indexing part 46 is located on one of the drum segments 4. The female indexing part 34 is located at the rear of the support member 3 with respect to the drum segments 4, facing towards a male indexing part 46 of another drum set 71, 72, 73, 74 in the stack.

Optionally, the drum sets 71, 72, 73, 74 can be provided with electronic, optical or physical tags (not shown), e.g. RFID tags, that allow the manipulator 5 to identify the characteristics of each drum set 71, 72, 73, 74 for production. Through the use of tags, the manipulator 5 can identify the drum sets 71, 72, 73, 74 as belonging to the same group 75. Alternatively, the tag can be arranged on the storage member 9.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A drum set for manufacturing a bead-apex for a tire, wherein the drum set comprises a plurality of drum segments which are distributed about a central axis of the drum set to form a drum, wherein the drum defines a circumferential edge for receiving a bead, wherein the drum segments of the drum set are radially movable with respect to the central axis to expand and contract the circumferential edge, wherein the drum set is arranged to be movable between an operational position in which the drum set is supported on a base for receiving a bead and a storage position in which the drum set is unsupported by said base, wherein the drum set further comprises a support member for supporting the drum segments of the drum set with respect to each other, wherein the support member is provided with guides for guiding the radial movements of the drum segments when the drum set is in the operational position, while the guides are arranged for retaining the drum segments of the drum set to the support member when the drum set is in the storage position.

2. The drum set according to claim 1, wherein the weight of the drum segments is fully supported on the support member in the operational position and/or the storage position.

3. The drum set according to claim 1, wherein the drum set is stackable with respect to identical drum sets.

4. The drum set according to claim 3, wherein the drum set comprises indexing parts for indexing the position of the drum set with respect to identical drum sets.

5. The drum set according to claim 1, wherein the drum segments are provided with handling members for handling by a manipulator.

6. An assembly for manufacturing a bead-apex for a tire comprising the drum set according to claim 1, and a base for supporting said drum set, wherein the base is provided with one or more mounting members for mounting the drum set in the operational position on the base.

7. The assembly according to claim 6, wherein the support member, in the operational position of the drum set on the base, extends between the base and the plurality of drum segments.

8. The assembly according to claim 6, wherein the base comprises an actuator for actuating the radial movement of the drum segments, wherein the actuator is arranged to drive the drum segments directly.

9. The assembly according to claim 7, wherein the base comprises an actuator for actuating the radial movement of the drum segments, wherein the actuator is arranged to drive the drum segments directly, wherein the support member is provided with an aperture to allow the actuator to directly drive the drum segments.

10. The assembly according to claim 9, wherein each of the plurality of drum segments is provided with a drive wheel facing towards the aperture in the support member, wherein actuator has a conical shape that tapers in the direction of the drum segments, wherein the actuator is movable in a driving direction parallel to the central axis to displace the drum segments radially outwards.

11. The assembly according to claim 6, wherein the assembly further comprises an apex support surface extending concentrically around the drum segments.

12. The assembly according to claim 11, wherein the support member extends radially outwards beyond the circumferential edge, wherein the apex support surface is formed by the part of the support member extending radially outwards beyond the circumferential edge.

13. The assembly according to claim 11, wherein the assembly comprises an annular member that is arranged to be fitted concentrically around the drum segments, wherein the apex support surface is formed by the annular member.

14. The assembly according to claim 13, wherein the annular member is arranged to be coupled to the support member.

15. The assembly according to claim 13, wherein the annular member is arranged to be mounted to the base.

16. The assembly according to claim 11, wherein the drum set comprises a number of support segments equal to the number of drum segments, wherein each support segment is mounted to a respective drum segment so as to move together with said respective drum segment in the radial direction, wherein the apex support surface is formed by the support segments.

17. An assembly for manufacturing a bead-apex for a tire, comprising a plurality of drum sets according to claim 1, and a base for supporting said plurality of drum sets, wherein the base is provided with one or more mounting members for mounting the plurality of drum sets in the operational position on the base.

18. The assembly according to claim 17, wherein the assembly comprises a plurality of bases for simultaneously supporting an equal number of the plurality of drum sets in respective operational positions.

19. The assembly according to claim 18, wherein the assembly comprises a turret that is rotatable about a turret axis, wherein the plurality of bases are mounted to the turret and distributed around the turret axis so as to be rotated by the turret through different production stations.

20. The assembly according to claim 17, wherein the plurality of drum sets comprises a number of identical drum sets equal to the number of bases.

21. The assembly according to claim 20, wherein the identical drum sets form a group of drum sets that is arranged to be used during the production of a batch of identical bead-apexes.

22. The assembly according to claim 17, further comprising a storage member for receiving a plurality of the drum sets.

23. The assembly according to claim 21, further comprising a storage member for receiving a plurality of the drum sets, wherein the storage member is arranged for receiving all drum sets of the same group.

24. The assembly according to claim 23, wherein all drum sets of the same group are arranged to be stacked on the storage member.

25. The assembly according to claim 24, wherein the wherein each drum set of the group comprises indexing parts for indexing the position of said drum set with respect to the other drum sets within the group.

26. The assembly according to claim 22, wherein the storage member is mobile and arranged for autonomously travelling a path between a production location near the bases and a more remote storage location.

27. The assembly according to claim 6, wherein the assembly further comprises a manipulator for mounting and removing one drum set with respect to its base.

28. The assembly according to claim 27, wherein each drum segment is provided with a handling member, wherein the manipulator is provided with an equal number of gripping members for gripping said handling members.

29. The assembly according to claim 28, wherein the handling members and the gripping members are formed as mutually matching, mutually meshing and/or mutually engaging hooks.

30. The assembly according to claim 27, wherein the gripping members are additionally arranged for placing and/or removing a bead or a bead-apex with respect to the drum set.

31. The assembly according to claim 30, wherein the drum segments are mutually spaced apart in the circumferential direction to form radially extending access channels between the drum segments, wherein the gripping members are arranged to be inserted into the access channels and to be moved radially outward into engagement with a bead or a bead-apex at the circumferential edge of the drum.

32. The assembly according to claim 31, wherein the handling members are offset in the circumferential direction with respect to the access channels, wherein the manipulator comprises a gripping head that is rotatable about the central axis of the drum, wherein the gripping members are provided on the gripping head such that rotation of the gripping head about the central axis of the drum brings the gripping members radially into alignment with either the access channels or the handling members.

33. The assembly according to claim 27, wherein the manipulator comprises a robot or a robot arm.

* * * * *